United States Patent [19]

Alexis

[11] 4,346,475
[45] Aug. 24, 1982

[54] DATA TRANSMISSION SYSTEM OPERATING ON THE SPREAD SPECTRUM PRINCIPLE

[75] Inventor: Roger P. J. Alexis, Neuilly-sur-Seine, France

[73] Assignee: U.S. Philips Corporation, New York, N.Y.

[21] Appl. No.: 166,285

[22] Filed: Jul. 7, 1980

[30] Foreign Application Priority Data

Jul. 13, 1979 [FR] France ............................. 79 18259

[51] Int. Cl.$^3$ ...................... H04B 1/12; H04B 15/00; H04K 1/04
[52] U.S. Cl. ........................................ 375/1; 364/604; 364/728
[58] Field of Search ................... 375/1; 364/604, 728

[56] References Cited

U.S. PATENT DOCUMENTS

| 3,590,380 | 6/1971 | Zegers | 375/1 |
| 3,666,889 | 5/1972 | Zegers | 375/1 |
| 4,209,834 | 6/1980 | Rabow | 375/1 |
| 4,241,312 | 12/1980 | Barnes | 375/1 |

Primary Examiner—Howard Britton
Attorney, Agent, or Firm—Thomas A. Briody; William J. Streeter; Edward W. Goodman

[57] ABSTRACT

According to the invention, it is proposed to use the code words D as the spreading word for the spectrum. The auto-correlation function of these words have zero values for all even temporary shifts other than the zero shift, the auto-correlation function then assuming the maximum or the minimum value. In addition, use is made of the secondary lobes of this auto-correlation function for carrying out, at the receiving end, the synchronization of a clock in the rhythm of the binary elements forming the spreading code words. Use: counteracting radio-electric interferences.

3 Claims, 4 Drawing Figures

DATA TRANSMISSION SYSTEM OPERATING ON THE SPREAD SPECTRUM PRINCIPLE

BACKGROUND OF THE INVENTION

The invention relates to a data transmission system operating on the spread spectrum principle, the system consisting on the one hand of a transmitting portion having a terminal for receiving data to be transmitted at two levels, an adjusting device to have a spreading code word correspond with the first level, this code word being chosen from among the code words D, and the inverted word with the second level, and a transmission circuit for transmitting the output signals of the adjusting device through a transmission channel, and, on the other hand, of a receiving portion, having a receiving circuit for receiving the signals transmitted through the transmission channel and for reproducing, after transmission, the output signals of the adjusting device, a correlation circuit for correlating the reproduced signals and the said code word, the correlation circuit having an input for shift signals which are processed by means of an oscillator circuit, and an output terminal for making the transmitted data available for further processing.

These transmission systems, which operate on the spread spectrum principle, are frequently used to counteract interferences. These systems and their uses are described in particular in the following publications:

the paper by R. C. Dixon entitled: "Spread Spectrum System", published in the collection: A WILEY-INTERSCIENCE PUBLICATION, published by JOHN WILEY AND SONS (NEW YORK . . . )

the article by W. F. UTLAUT entitled: "Principes des techniques d'étalement du spectre—possibilités d'application dans l'utilisation et l'attribution des fréquences radio électriques", which appeared in the periodical "LE JOURNAL DES TELECOMMUNICATIONS", Volume 45-1/1978.

In accordance with these systems, for the transmission of data, that is to say a binary element having a given duration, a plurality of binary elements of a shorter duration are transmitted. This plurality of elements corresponds either with the spreading code word for one value of the data, or with the inverted code word for the other value of the data. The choice of the spreading code word is decisive. This code word must have adequate "auto-correlation properties", that is to say the correlation of this word with itself passes through an accurate maximum or minimum for a temporary shift which is equal to zero relative to the other shifts.

French patent specification No. 2,363,268 describes a system which uses two spreading words: these two words are chosen from among the complementary words of the code D. These codes D are particularly defined in the following articles: "Quaternary codes for pulsed radar" by George R. WELTI, published in IRE Transactions on Information Theory, June 1960, and "Complementary Series" by Marcel J. E. Golay, published in IRE Transactions on Information Theory, April 1961. By combining these complementary words a satisfactory auto-correlation function is obtained, as it assumes a zero value for all temporary shifts other than zero. Nevertheless, this described system has the drawback that two transmission channels must be provided for the transmission of each of these two code words, necessitating the use of additional material.

SUMMARY OF THE INVENTION

Although the present invention uses the code words D, it has recourse to properties other than the complementary character of the code words D, and no additional material is therefore present.

Namely, a transmission system of the type defined in the opening paragraph is characterized in that there is provided between the output of the correlation circuit and the output terminal of the receiving portion a gate circuit which is controlled from the signals produced by the oscillator circuit to render this gate conductive for each shift which is equal to an even number of times the duration of a binary element which forms the spreading code word.

Thus, according to the invention, the fact is utilized that the auto-correlation function of the code words D has zero values for all even temporary shifts other than zero where the auto-correlation function assumes its maximum or its minimum value.

In these systems it is important to obtain, at the level of the receiving portion, shift signals for the correlation circuit which have been synchronized in the rhythm of the binary element forming the spreading code words. This synchronization can be realised in accordance with an important feature of the invention. A transmission system according to the invention is characterized in that the signals, which are applied to the input for the shift signals, have a frequency which is double the rate of appearance of the binary elements which form the spreading code words, that the correlation circuit comprises a first integrating circuit for integrating at the said double rate the signals applied to its input, and also a shift register for analog signals, the input of which is connected to the output of the first integrating circuit, and at the output of which the correlated pairs of samples appear, and that first means have been provided to give all these pairs the same polarity, while second means follow after the first means for changing the polarity of the first or the second samples of the pairs, and an integrating means is connected to the output of the second means for producing a correction signal for the oscillator circuit.

DESCRIPTION OF THE DRAWINGS

The invention will be further explained with reference to the accompanying drawings.

DESCRIPTION OF THE PREFERRED EMBODIMENT

Figure 1:
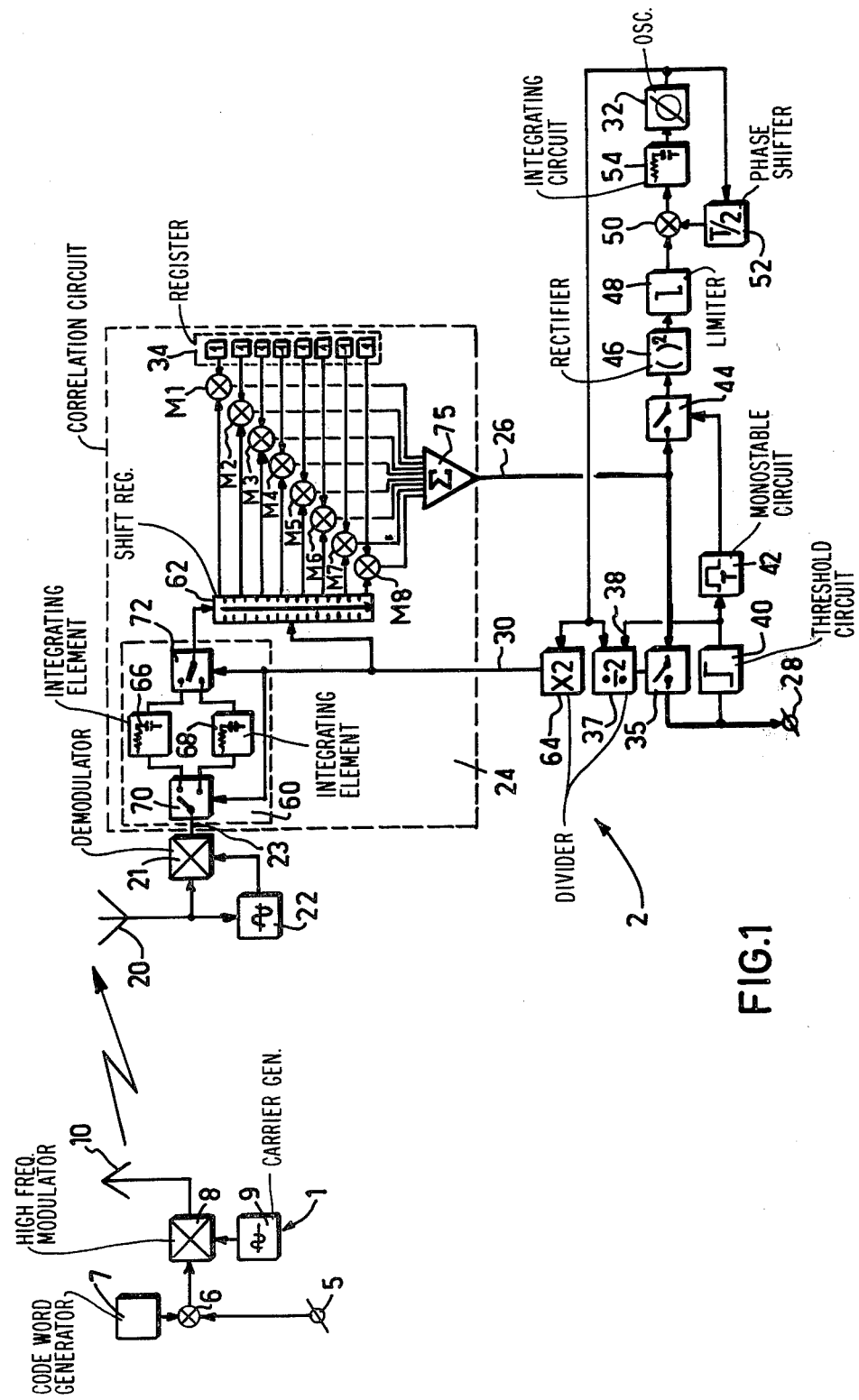
FIG. 1 shows a system according to the invention.

The code words D are here defined by the property utilized in the present invention, that is to say that each word whose non-periodical auto-correlation function is zero for even shifts which are unequal to zero, is suitable for use in the transmission system according to the invention. These words may be obtained in the manner described in the above-mentioned article by G. Welti. The words are formed in groups. A group of the order k is formed from i words $D_i^k$ (where $1 \leq i \leq 2^k$) of the length $2^k$.

The use of an induction method is the simplest means to form these words. The $2^k$ words $D_i^k$ are arranged in accordance with a Table which forms a square matrix split into two equal portions A and B:

$$D_i^k = \| A_i^k \mid B_i^k \| \quad (R1)$$

Starting from this group, a group of the order k+1 is obtained by the relation:

$$D_i^k + 1 = \left\| \begin{array}{c|cc} D_i^k & A_i^k & \overline{B_i^k} \\ D_i^k & \overline{A_i^k} & B_i^k \end{array} \right\| \quad (R2)$$

The sign — in the relevant matrix indicates that 1 has been replaced by −1 and −1 by 1. The starting point is:

$$D_i^1 = \left\| \begin{array}{cc} 1 & 1 \\ 1 & -1 \end{array} \right\| \quad (R3)$$

The essential property of the words is that the non-periodical auto-correlation function is zero for shifts which are unequal to zero.

Each word may be split into two words, each having half the original length, by separating the odd elements from the even elements. These are the "complementary series" described in the above-mentioned article by J. E. Golay.

Starting from a pair of complementary series, further series can be formed in accordance with one of the following six methods:

(a) interchanging the two series,
(b) inverting the sequence of the first series,
(c) inverting the sequence of the second series,
(d) inverting the first series, (that is to say by replacing 1 by −1 and −1 by 1),
(e) inverting the second series,
(f) inverting the even elements of each series.

To form a group $D_i^2$ the starting point is the relation (R3):

$$A_1^i = \left\| \begin{array}{c} 1 \\ 1 \end{array} \right\| \text{ and } B_1^i = \left\| \begin{array}{c} 1 \\ -1 \end{array} \right\|$$

and by applying the relation (R2):

$$D_i^2 = \left\| \begin{array}{cccc} 1 & 1 & 1 & -1 \\ 1 & -1 & 1 & 1 \\ 1 & 1 & -1 & 1 \\ 1 & -1 & -1 & -1 \end{array} \right\|$$

A second group can be formed on the basis of the above-mentioned group by using, for example, the method mentioned sub (d) and (e):

$$D_i^{2'} = \left\| \begin{array}{cccc} -1 & -1 & -1 & 1 \\ -1 & 1 & -1 & -1 \\ -1 & -1 & 1 & -1 \\ -1 & 1 & 1 & 1 \end{array} \right\|$$

Groups having 8 binary elements are always written by way of example as:

$$D_i^3 = \left\| \begin{array}{cccc|cccc} 1 & 1 & 1 & -1 & 1 & 1 & -1 & 1 \\ 1 & -1 & 1 & 1 & 1 & -1 & -1 & -1 \\ 1 & 1 & -1 & 1 & 1 & 1 & 1 & -1 \\ 1 & -1 & -1 & -1 & 1 & -1 & 1 & 1 \\ 1 & 1 & 1 & -1 & -1 & -1 & 1 & -1 \\ 1 & -1 & 1 & 1 & -1 & 1 & 1 & 1 \\ 1 & 1 & -1 & 1 & -1 & -1 & -1 & 1 \\ 1 & -1 & -1 & -1 & -1 & 1 & -1 & -1 \end{array} \right\|$$

In the further course of this description the word $D_6^3$ will be used, that is to say 1, −1, 1, 1, −1, 1, 1, 1.

The transmission system shown in FIG. 1 comprises a transmitting portion 1 and a receiving portion 2. The data to be transmitted are available at the terminal 5 in the form of a series of binary elements. A multiplying element, an input of which is connected to the terminal 5 and whose other input is connected to the output of a generator 7, generating a code word D, is denoted by reference numeral 6. This code word D is the word defined previously. The element 6 performs the following function: when the data to be transmitted has the value: +1 the sequence: 1, −1, 1, 1, −1, 1, 1, 1, is available at the output of this element 6. When the data to be transmitted has the value −1, the sequence: −1, +1, −1, −1, +1, −1, −1, −1 is available at the output. So the width of the spectrum of the data to be transmitted has been multiplied by eight. For the radio-electric transmission of these sequences a high frequency modulator 8 is used which is controlled by a high-frequency carrier generator 9 and an aerial 10.

An aerial 20 has been provided in the region of the receiving portion 2 to receive the carrier transmitted by the aerial 10. After demodulation of the carrier by means of a demodulator 21, which is fed by a generator 22, there is obtained at the output 23 of the demodulator 21 a noisemutilated reproduction of the output signals of the multiplying element 6. The output 23 is connected to the input of a correlation circuit 24 the output 26 of which is connected to the output terminal 28. The correlation circuit 24 has an input 30, which receives the shift signals, that is to say signals which determine the rate of shift within the correlation circuit 24. These signals are received from an oscillator circuit 32, which is constituted by a voltage-controlled oscillator. These signals have a period of the duration T, which is equal to the duration of a binary element forming the code word. This code word is obtained from a register 34, which forms part of the correlation circuit 24.

The transmission system according to the invention is characterized in that there is provided between the output 26 of the correlation circuit 24 and the output terminal 28 of the receiving portion 2 a gate circuit 35 which is so controlled by means of the signals produced by the oscillator 32 that it is rendered conductive at each shift which is equal to an even number of times the duration T of a binary element which constitutes the spreading code word. This is realized by means of a divide-by-two divider 37, arranged between the output of the oscillator 32 and the control input of the gate circuit 35. This divider 37 has a triggering input 38, which is connected to the output of a positive or negative threshold detector 40, the input of which is connected to the output terminal 28 so that, as soon as a maximum or a minimum value of the output signal of the correlation circuit 24 has been detected, the divider circuit 37 starts counting. A monostable circuit 42 produces a pulse of a duration T, as soon as the detector 40 releases a signal. The output signal of the circuit 42 is applied to the control circuit of a second gate circuit 44 to adjust the latter to the non-conductive state. A rectifier circuit 46 squares the voltage available at the output of the gate circuit 44. A voltage limiting circuit 48 limits the amplitude of the signal produced by the circuit 46. This voltage limiting circuit 48 is followed by a multiplying element 50 an input of which is connected to the output of the limiting circuit 48 and the other input of which is connected to the output of a phase shifting element 52, which produces a time delay equal to T/2. The output of the multiplying element 50 is connected to the frequency control circuit of the oscillator 32 via an integrating circuit 54.

The correlation circuit 24 comprises an integrating circuit 60, which connects the output 23 of the demodulator 21 to the input of a 15-position shift register 62 for analog signals. The integrating circuit 60 is controlled by signals obtained from a divide-by-two frequency divider 64 the input of which is connected to the output of the oscillator 32. This integrating circuit 60 produces a signal which represents the integral of the signal, produced by the demodulator 21, taken during consecutive periods of time T/2. In the drawing, this integrating circuit 60 consists of two integrating elements 66 and 68, which are alternately fed via a switch 70 with the output signals of the demodulator 21 and the output signals of which are alternately checked by means of a further switch 72, which is controlled in synchronism with the first switch. It will be apparent for one skilled in the art that the integrating circuit 60 and the shift register 62 may consist of a charge-coupled device (CCD). Only the odd positions are of importance for the correlation: eight multipliers M1–M8 multiply the binary elements in the odd positions of the register 62 by the elements of the code word D. The result of the correlation is available at the output 26 of a summing amplifier 75. Should it be desired to change the code word, it is possible to realize the entire circuit by means of a correlation circuit with charge coupled device.

The operation of such a system will now be explained with reference to the FIGS. 2, 3 and 4. Let it be assumed, by way of example, that the information to be transmitted consists of the binary elements "ebA", "ebB", "ebC", "ebD", whose value is $+1, -1, -1, +1$, respectively. When this series is "modulated" by the selected code word D, a sequence of signals is produced at the output of the multiplying element 6, this sequence also being found at the output of the demodulator 23.

Figure 2:
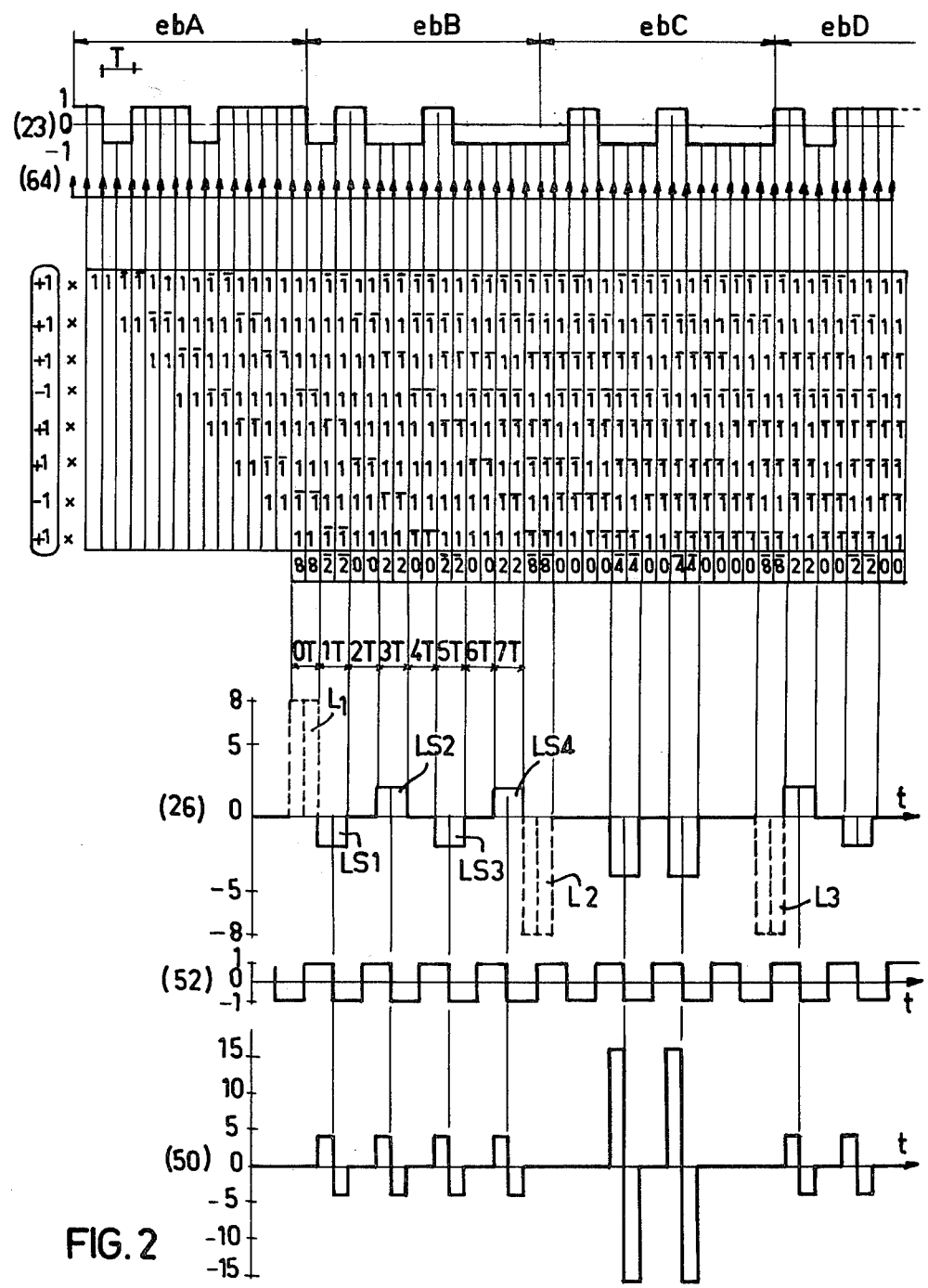
FIG. 2 illustrates the operation of the receiving portion where the local clock is in synchronism with the rhythm in which the binary elements of the spreading code word appear.
Figure 3:
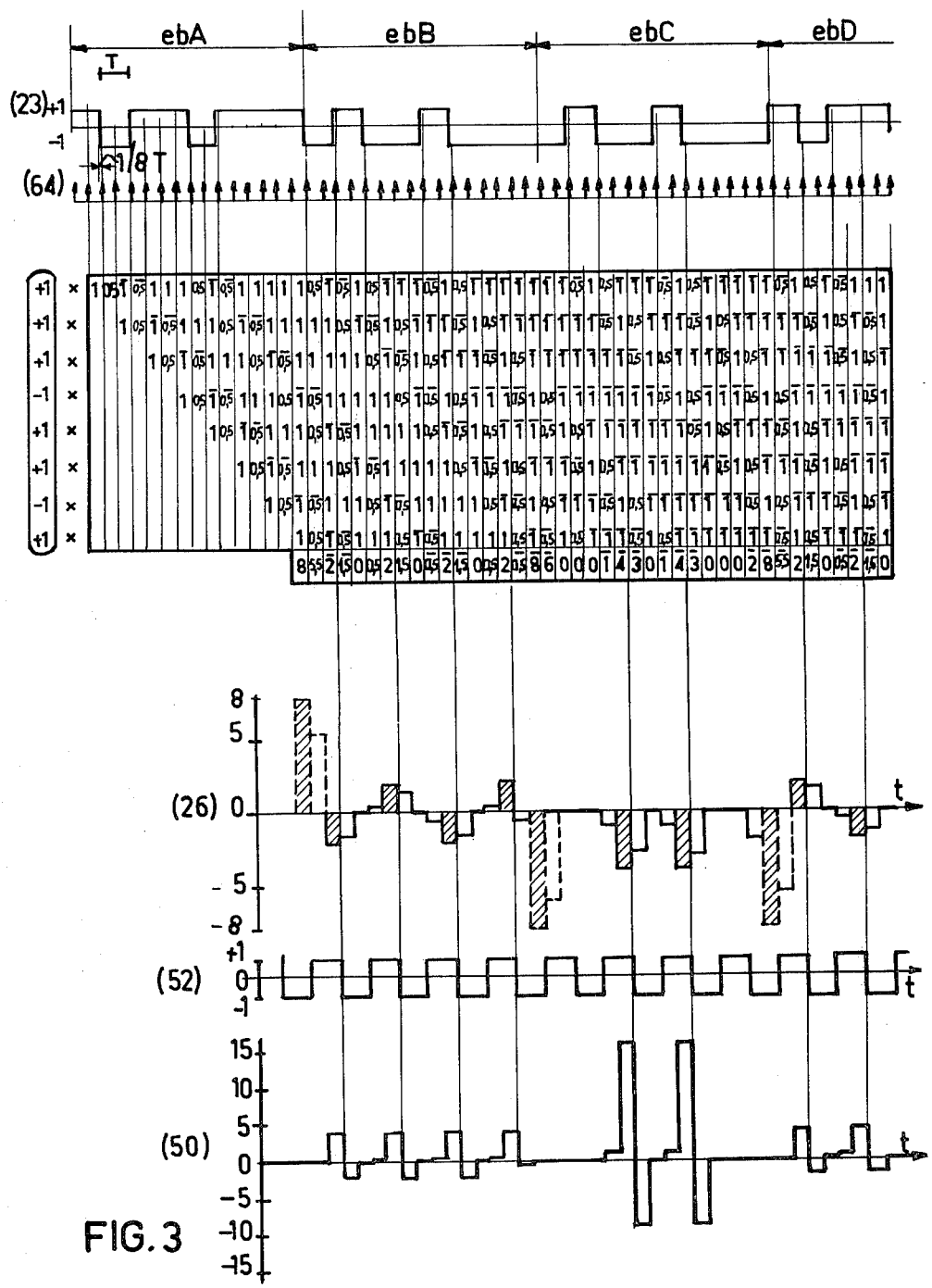
FIG. 3 illustrates the operation of the receiving portion where the local clock is fast with respect to the appearance of the binary elements of the spreading code word.
Figure 4:
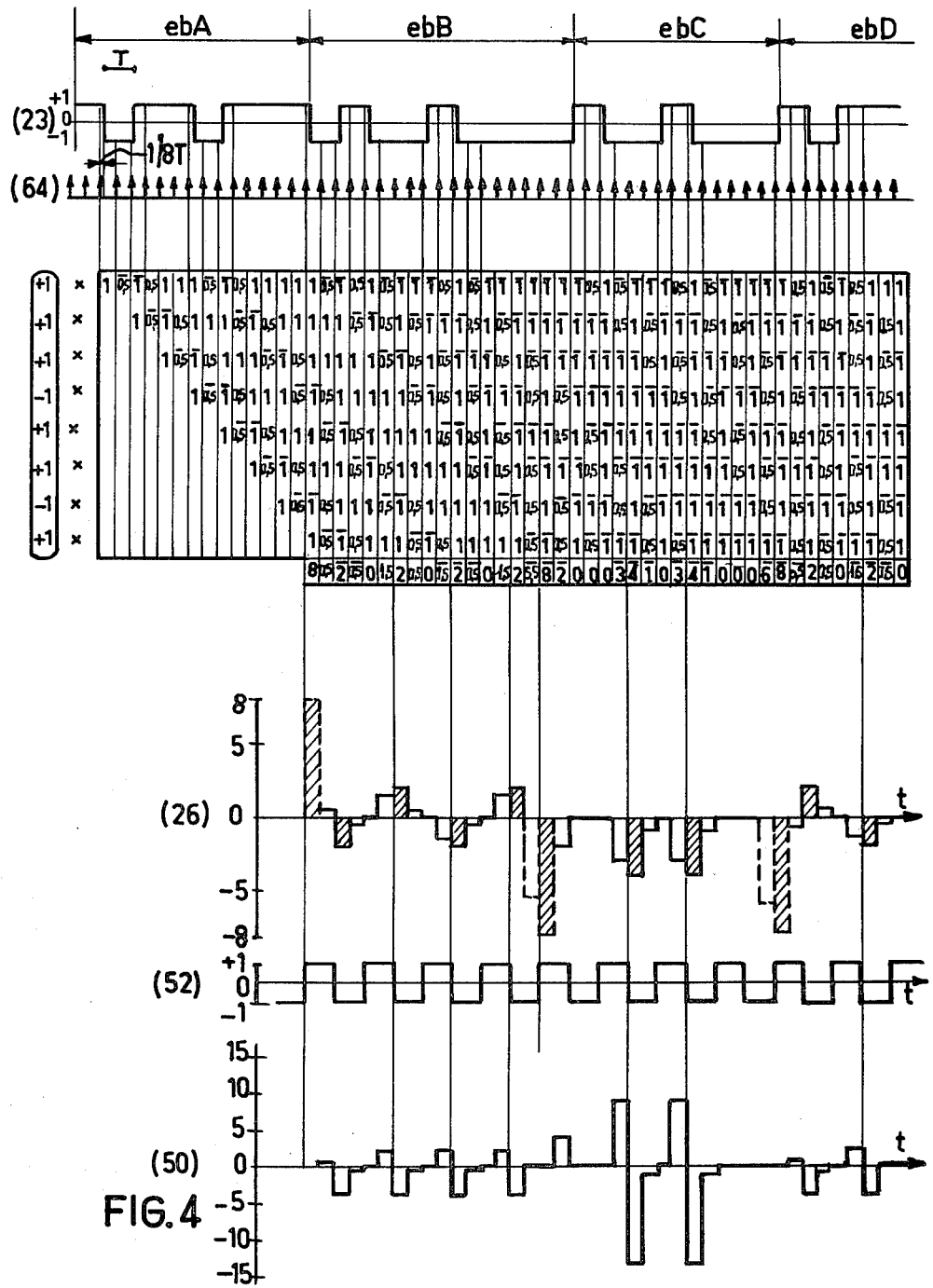
FIG. 4 illustrates the operation of the receiving portion where the local clock is slow with respect to the appearance of the binary elements of the spreading code word.

This sequence is represented in the FIGS. 2, 3 and 4, by the line provided with reference numeral 23. For simplicity of the explanation of the operation, the noise which is in particular produced during the transmission between the aerials 5 and 10 will be neglected. The arrows at the lines referenced 64 in the FIGS. 2, 3 and 4 denote only the active edges of the output signal of the circuit 64. The Table represents the manner in which the shift register is filled. The last line of the Table indicates the digital value of the output signal 26 of the correlation circuit 24. Reference numeral 26 denotes the line which represents the variation of the output signal 26 of the correlation circuit 24. Reference numeral 52 denotes the line which represents the variation of the signal at the output of the phase shifter 52 and reference numeral 50 denotes the line which represents the signal at the output of the multiplying element 50.

FIG. 2 represents the situation in which synchronization has been obtained. At the output 26 the dotted lobes L1, L2 and L3 represent either the maximum or the minimum of the auto-correlation function. The signal at the output has also secondary lobes LS1, LS2, LS3 and LS4 for the lobes located between the main lobes L1 and L2. If zero shift is allotted to the main lobes it will be seen that the secondary lobes appear only at the odd shifts 1T, 3T, 5T and 7T and that the function is zero (neglecting noise) at the odd shifts 2T, 4T, 6T. The gate circuit 35 is rendered conductive for the shifts 0T, 2T, 4T, 6T, so that the auto-correlation function examined at the output 26 will show a proper contrast, noise now being taken into account. The threshold detector 40 detects the beginning of the main lobes and adjusts the gate circuit 44 to the non-conducting state by means of the monostable circuit 42. Then, the main lobes are not examined by the circuits which follow after this gate 44. The secondary lobes are given the same polarity by the circuit 46. The circuit 48 limits the dynamic of the signals. These lobes can be divided by means of the multiplying element 50. It can be seen that each lobe is formed by the result of two correlations carried out during periods of time which are equal to T/2. These two correlations are separated by the multiplying element 50, the first correlation is located by $+1$ and the second by $-1$, these signals of the values $+1$ and $-1$ being produced by the phase shifter 52. It can be seen that when there is synchronization of the line (26) at the line (50), the positive portion is equal to the negative portion so that the signal is zero at the output of the integrating network 54 and it is not necessary to collect the frequency of the oscillator 32.

FIG. 3 shows the case where the local clock is fast by a period equal to $\frac{1}{8}$ T, as a result of which the auto-correlation function is decreased; no constant level is obtained any longer between each duration T/2. The main lobes and the secondary lobes have two levels for each portion of the period of time T/2. The hatched portions show values which were found during synchronism. This unequality is shown by means of the multiplying element 50. The amplitude of the portions having a positive polarity surpasses the amplitude of the negative polarity portions so that a positive voltage is obtained at the output of the network 54; this voltage is used to correct the frequency of the oscillator 32.

FIG. 4 shows the case where the local clock is slow by a period of time equal to $\frac{1}{8}$ T. Also in this case it is found that the lobes deteriorate; also here the hatched portions represent values found during synchronism. The line 50 in FIG. 4 represents the variation of the signal at the output of the multiplying element 50. There the negative portion surpasses the positive portion so that a voltage having a polarity which is the opposite of the polarity in the situation described with reference to FIG. 3 corrects the frequency of the oscillator 32. It should be noted that the variation at the output of the element 50 can be changed to some extent by acting on the threshold value of the detector 40.

What is claimed is:

1. A data transmission system operating on the spread system principle, the system consisting, on the one hand, of a transmitting portion having a terminal for receiving data to be transmitted at two levels, an ajdusting device for generating a spreading code word corresponding with the first level, this code word being selected from among the code words D, and an inverted version of said code word corresponding with the second level, and a transmission circuit for transmitting the output signals of the adjusting device through a transmission channel and, on the other hand, of a receiving portion comprising a receiving circuit for receiving the signals from the transmission channel and for reproducing, after transmission, the output signals of said adjusting device, a correlation circuit for correlating the reproduced signals and said code word, the correlation circuit having an input for shift signals, an oscillator circuit coupled to the output of said correlation circuit for forming said shift signals, and an output terminal for supplying the transmitted data for further processing, characterized in that there is provided, between the output of the correlation circuit and the output terminal of the receiving portion, a gate circuit which is controlled from the signals produced by the oscillator circuit in order to be rendered conductive for each shift which is equal to an even number of times the duration of a binary element forming the spreading code word.

2. A data transmission system as claimed in claim 1, characterized in that the signals which are applied to the input for shift signals have a frequency which is double the rate of appearance of the binary elements forming the spreading code words, that the correlation circuit comprises a first integrating, circuit for integrating at said double rate, the signals applied to the input thereof, and a shift register for analog signals, the input of which is connected to the output of the first integrating circuit and an output at which the correlated pairs of samples appear, and that first means have been provided to give all these pairs the same polarity, while the first means are followed by second means for changing the polarity of the first or the second samples of the pairs and an integrating means is connected to the output of the second means for producing a correction signal for the oscillator circuit.

3. A data transmission system as claimed in claim 2, characterized in that the correlation circuit is formed by means of a charge coupled device.

* * * * *